Oct. 14, 1969  R. EVRARD  3,472,078
PRESSURE MEASURING INSTRUMENT
Filed April 4, 1968  2 Sheets-Sheet 1

INVENTOR.
ROBERT EVRARD
BY
AGENT

United States Patent Office 3,472,078
Patented Oct. 14, 1969

3,472,078
PRESSURE MEASURING INSTRUMENT
Robert Evrard, Champigny-sur-Marne, France, assignor, by mesne assignments, to U.S. Philips Corporation, New York, N.Y., a corporation of Delaware
Filed Apr. 4, 1968, Ser. No. 718,713
Claims priority, application France, Apr. 11, 1967, 102,289
Int. Cl. G01l 9/16
U.S. Cl. 73—398                           1 Claim

ABSTRACT OF THE DISCLOSURE

An ultra-high vacuum gauge employing a glass tube in which a graphite disc magnetically suspended by levitation is rotatable and surrounded by metal plates which reflect infrared radiation but not incident gas molecules.

---

The patent application Ser. No. 445,566 filed Apr. 5, 1965, now Patent No. 3,357,254, relates to a thermomolecular member for measuring gas pressures which are sufficiently low to permit of considering the paths of the molecules inside the measuring instrument to be rectilinear. Inside a space whose pressure has to be determined the measuring instrument comprises a movable element adapted to rotate about one of its axes of symmetry, for example, a disc. This element is subjected to a mechanical moment due to the gas molecules striking selectively the two half surfaces symmetrical to said axis, the velocity of which molecules is increased by the contact with a comparatively hot surface. The whole surface of the movable element is struck by gas molecules, which, in general, have a comparatively low velocity which corresponds to the thermal equilibrium of the gas relative to the whole instrument. This does not apply to the molecules striking said hot surface and repelled by the hot surface after a period of capture with a velocity corresponding to the thermal equilibrium relative to the hot surface and not relative to the whole instrument. The whole device may be considered to form a thermal machine in which the hot surface constitutes the "heat source," whereas the further part of the device having a lower temperature constitutes the "cold source," which has to be cooled.

In order to exert an effective moment on the movable element, a suitable member has to direct, as stated above, the molecules of higher velocity selectively to the two half faces of the element lying symmetrical to the rotary axis. The term "half face" only applies to an element of flat shape, in this case a disc. This shape may be very effective, but it is not necessary to choose this shape. An element in the form of a wheel may be appropriate. It is only of importance that all or most of the molecules incident to the element should tend to rotate the element in the same direction. According to the application Ser. No. 445,566 the selective control of the "hot" molecules is obtained by means of a cylindrical thick screen having apertures directed so that a whirl of the rectilinear paths of the molecules is obtained, which are heated by their contact with a surface surrounding the screen. In the thermodynamic respect the screen constitutes the "cold source."

The apertures in this screen select, however, not only the "hot" molecules but also in the same manner the infrared rays inevitably emerging from the hot surface, whereas the irradiation of the cold screen is practically negligible. The radiation exerts a pressure (and hence a moment) on the movable element similar to the pressure or the moment exerted by the "hot" molecules. This moment has the same sense as the moment referred above. However, said moment has to be considered to be a parasitic one, since it is not dependent upon the gas pressure to be measured. If said pressure drops to about $10^{-8}$ torr, the moment produced by the incident "hot" molecules is small with respect to the moment exerted by the radiation and if the pressure continues decreasing, the moment becomes practically negligible so that it can no longer be measured.

In order to suppress said parasitic moment windows of a material permeable to infrared radiation have been arranged in the solid parts of the screen between the apertures for selecting the "hot" molecules. The infrared radiation striking the movable element passes through the screen not only via the apertures but also via said windows. With sufficiently large dimensions and an appropriate orientation of said windows the infrared radiation can be distributed substantially uniformly across the movable element so that the parasitic moment is suppressed.

However, the adjustment of this compensation is critical. Moreover, the surface of the screen capable of accommodating said compensation windows is necessarily larger than the surface of the apertures intended for the "hot" molecules, so that the number of molecules likely to strike the movable element to produce the effective moment is reduced.

The present application has for its object to improve said pressure measuring instrument by obviating said disadvantages. The improvement resides in the use of a different cold screen. This cold screen for a thermomolecular measuring instrument comprising a hot surface beyond said screen and a rotatable element surrounded by said screen, said cold screen having apertures orientated so that a moment can be exerted on the movable element by thermomolecular action in a given direction, is characterized in that the active portion of the screen is formed by thin plates forming surface portions extending parallel or substantially parallel to the rotary axis of the element and made of a material reflecting infrared radiation and not reflecting gas molecules.

This screen has the advantage that the thin-plate structure leaves much space between the plates for passing the "hot" gas molecules which produce the effective torque. This torque is therefore higher than with the thick screen employed before. The orientation of these plates, which corresponds with that of the guide blades of a turbine, provides an appropriate selection of the "hot" gas molecules travelling between the plates. However, this selection is effective only when the "hot" molecules passing through the screen and remaining "hot" are only those molecules which have been in contact with said plates.

The cold screen does not serve for capturing or absorbing the molecules; it serves to reduce the velocity of "hot" molecules striking the plates, since these molecules are not travelling in the correct sense.

When a surface is struck by molecules two phenomena may occur.

One of them, a fairly rare one, is that of reflection: the molecule is repelled in a direction which is symmetrical to the direction of incidence of the molecule, whilst the velocity remains the same.

The second, more frequent phenomenon is that of the absorption: the molecule is temporarily absorbed in the surface and re-emitted in a substantially arbitrary direction with a velocity corresponding to the thermal equilibrium relative to the surface. In practice these two phenomena mix up to a greater or lesser extent. The second phenomenon is conductive to the directional effect of the plates: for being certainly effective a molecule has to pass between two substantially parallel plates across the screen and has to remain "hot," its direction of travel being substantially parallel to that of the plates. Otherwise the molecule strikes one of the plates and is cooled.

The reflection to different sides counteracts the directional effect of the plates. This applies both to the paths of the molecules and to the infrared rays, although for the latter it is not the alternative of reflection or capture, but that of reflection and absorption which occurs. In order to suppress the parasitic moment due to the radiation pressure, it is therefore required in accordance with the present application for a patent of addition for the plates to reflect the infrared radiation. If the plates are perfect mirrors, their directional effect disappears. They change it is true the orientation of given separate infrared rays, but in general they maintain the isotropy.

The invention will now be described more fully with reference to FIGS. 1 and 2, which show by way of example one embodiment of the pressure measuring instrument improved in accordance with the present application. The scope of the invention includes as a matter of course the method of operating and the device required thereto and equivalent embodiments thereof.

The figures show only those elements which are required for a good understanding of the invention. The elements shown in these figures and corresponding with those of the application Ser. No. 445,566 are designated by the same reference numerals.

Figure 1:
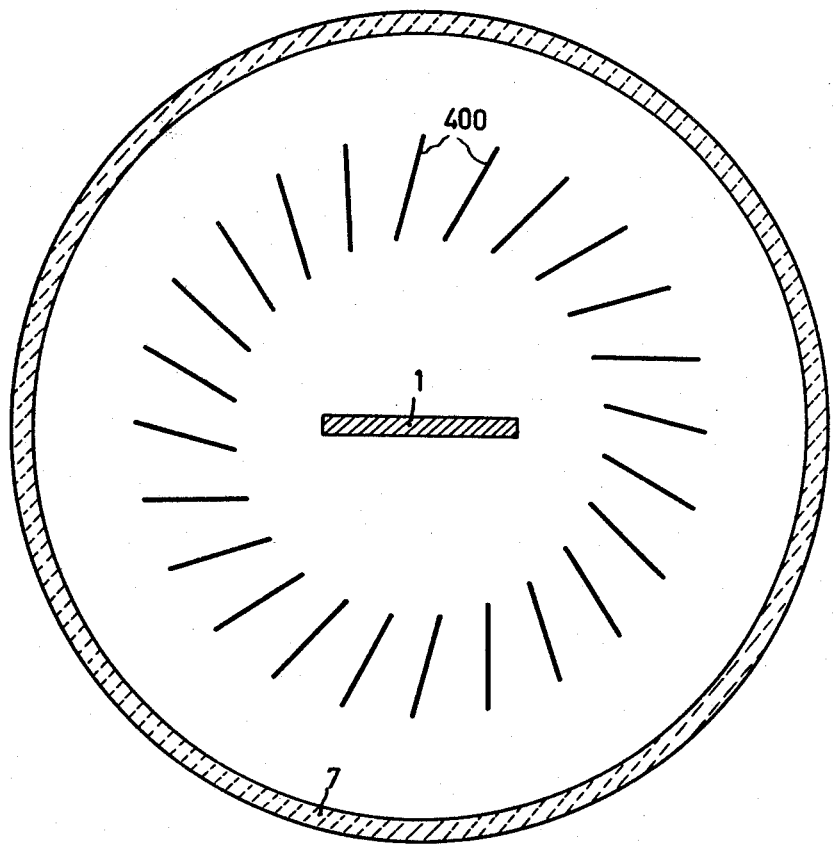
FIG. 1 is a cross sectional view of the cold screen according to the invention.
Figure 2:
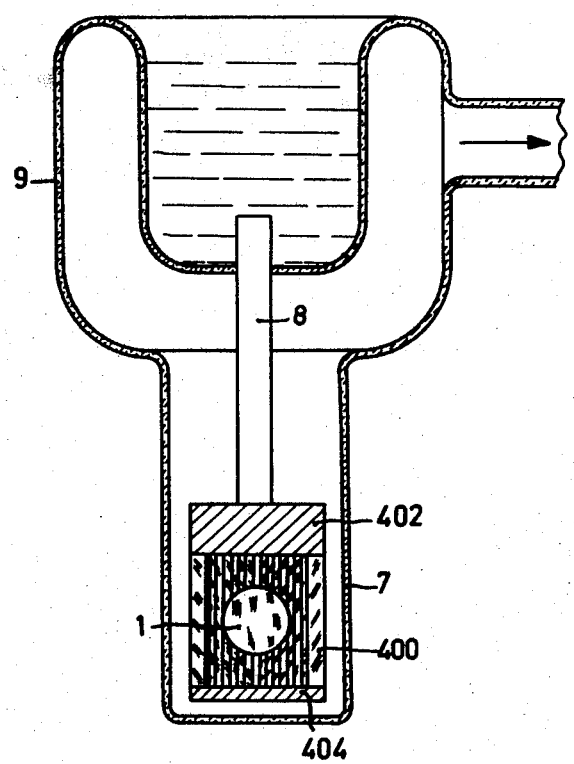
FIG. 2 is a diametrical sectional view of the same screen.

FIG. 1 shows the heat source formed by the wall 7 of the space whose pressure has to be measured and the movable graphite disc 1, which is kept floating by magnetic levitation, as is explained in the main application. This disc is rotatable about the vertical axis at right angles to the plane of the drawing. The figure furthermore shows the plates 400 having a thickness of 0.1 mm., a width of 1.5 mm. and a length (FIG. 2) of 8 mm. These plates are made of molybdenum, which material is chosen for the following reasons: it is not magnetic and will therefore not deform the field of levitation; it is a good thermal conductor which allows cooling of the plates forming the screen by one end or by both ends. Also mechanically this metal is quite appropriate. Moreover, in vacuum it does not evolve gas likely to deteriorate the atmosphere of the space concerned. Finally, as stated above, this material reflects effectively the infrared radiation, whereas it does substantially not reflect the incident gas molecules. This means that the "hot" molecules emanating from the source 7 and striking a plate 400 are temporarily absorbed at this plate and then emitted with a velocity corresponding to the temperature of the plate, which is lower than that of the source 7. FIG. 2 shows the upper supporting member 402 of copper, in which the plates 400 are fastened. This supporting member is thick and is integral with a copper rod 8, through which it is in connection with liquid nitrogen in the Dewar vessel 9. Thus not only the supporting member 402 which interconnects the plates 400 on the lower side.

What is claimed is:
1. A pressure measuring instrument including a cold screen for use in a thermomolecular measuring member, comprising a hot surface beyond said screen and a rotatable element inside said screen, said cold screen having apertures orientated so that a thermomolecular effect due to gas molecules from the hot surface passing through the screen exerts a moment in a given direction on said rotatable element, said screen being formed by thin plates having surface portions extending parallel to the rotary axis of said element, said plates being made of a material which reflects the infrared radiation and does not reflect the gas molecules.

References Cited

UNITED STATES PATENTS 3,357,254  12/1967  Evrard _____ 73—398

DONALD O. WOODIEL, Primary Examiner

PO-1050
(5/69)

UNITED STATES PATENT OFFICE
CERTIFICATE OF CORRECTION

Patent No. 3472078        Dated October 14, 1969

Inventor(s) Robert Evrard

It is certified that error appears in the above-identified patent and that said Letters Patent are hereby corrected as shown below:

Column 4, line 18, after "402" insert

--but also the plates 400 are cooled and even the supporting member 404--

Signed and sealed this 14th day of July, 1970

(SEAL)
Attest:

Edward M. Fletcher, Jr.
Attesting Officer

WILLIAM E. SCHUYLER, JR.
Commissioner of Patents